US000001891H

United States Statutory Invention Registration [19]

[11] Reg. Number: H1,891

McClenahan et al. [45] Published: Oct. 3, 2000

[54] SIGHT EYE MARKSMANSHIP TRAINING AID

[75] Inventors: Charles H. McClenahan, Fort Walton Beach; Edward F. Downs, Jr., Lynn Haven, both of Fla.

[73] Assignee: The United States of America as represented by the Secretary of the Air Force, Washington, D.C.

[21] Appl. No.: 08/800,639

[22] Filed: Feb. 14, 1997

Related U.S. Application Data

[60] Provisional application No. 60/011,736, Feb. 15, 1996.

[51] Int. Cl.[7] ..... F41A 3/26

[52] U.S. Cl. ..... 434/19

[58] Field of Search ..... 434/11, 19, 20; 42/101; 396/426; 89/41.05

[56] References Cited

U.S. PATENT DOCUMENTS

| | | | |
|---|---|---|---|
| 3,798,796 | 3/1974 | Stauff et al. | 434/20 |
| 4,290,219 | 9/1981 | Boller et al. | 42/101 X |
| 4,993,819 | 2/1991 | Moorhouse | 434/20 X |
| 5,020,262 | 6/1991 | Pena | 434/20 X |

FOREIGN PATENT DOCUMENTS

| | | | |
|---|---|---|---|
| 3001050 | 7/1981 | Germany . | |
| 2078914 | 1/1982 | United Kingdom | 434/20 |

*Primary Examiner*—Michael J. Carone
*Assistant Examiner*—Meena Chelliah
*Attorney, Agent, or Firm*—Fredric L. Sinder

[57] ABSTRACT

A new apparatus for displaying and recording an image viewed by a marksman or shooter through a weapon sight is described. A beam splitter is mounted at the eye end of the weapon sight and bends part of the image intended for the shooter 900° to a righting prism which bends the image another 900°, for a total of 180°. The image from the righting prism is directed to the input of a miniature video camera mounted over and parallel with the weapon sight. The video camera transmits the image to a remote miniature video display and to a remote video recorder. By bending the image a total of 180°, the video camera can be mounted in a low profile position over the weapon sight such that the overall balance of the weapon is minimally upset.

1 Claim, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SIGHT EYE MARKSMANSHIP TRAINING AID

CROSS-REFERENCE TO RELATED APPLICATIONS

This application claims priority under 35 U.S.C. § 119(e) from U.S. Provisional application Ser. No. 60/011,736, filed Feb. 15, 1996, by applicants Charles H. McClenahan and Edward F. Downs, Jr. (Frank Downs), titled Sight Eye.

RIGHTS OF THE GOVERNMENT

The invention described herein may be manufactured and used by of for the Government of the United States for all governmental purposes without the payment of any royalty.

BACKGROUND OF THE INVENTION

The present invention relates generally to marksmanship training aids, and more specifically to an optical system for displaying and recording the same image as viewed by a shooter through a rifle sight.

Military forces and civilian police forces include as part of their arsenals elite snipers trained to operate in difficult environments. With the increased threat of terrorist activity around the world, the availability of well-trained snipers is imperative. Training is costly and time-consuming and, particularly in the case of the military, which has a constant turnover of personnel, more efficient and faster training methods must be developed.

The prior art includes a variety of shooter training aids adapted for rifles and for larger weapons such as artillery. The prior art for artillery, or gunnery, training includes a viewing device which fits over the eyepiece end of a gun sight (where the gun sight is not attached to the gun barrel or barrels). A prism redirects part of the gun sight image to a flexible optical fiber to deliver the gun sight image to a remotely located instructor and to a recorder for later playback and analysis of the training exercise. The older prior art for rifle training includes apparatus for mounting a film camera onto a rifle sight and for activating the camera shutter at the same time as the rifle trigger is pulled. More recent prior art for rifle training includes a video camera mounted at the eyepiece end of a telescopic rifle sight.

Unfortunately, these prior art training devices are either large and unwieldy (which is not usually a problem for artillery or gunnery sights) or, in the case of newer rifle training aids which use more recently available smaller video components, the optical and video components are still mounted at the eye end and behind the rifle sight so that even the lighter weight of these newer components is sufficient to throw a rifle off balance, a particularly severe problem when training with sniper rifles.

Generally, the only part of a sniper rifle touched when it is fired is the trigger by a shooter's finger. The front of the rifle rests on a support and the rear only rests against the shooter's shoulder. Their balance is so sensitive that shooters must learn to control their breathing and even their heartbeat.

Another problem with prior art marksmanship training aids is that they generally are not weather resistant. As such, they are mostly limited to use as training aids and fuller advantage of the fact that a second target display identical to the image viewed by the shooter will find valuable use in the field cannot be made.

Thus it is seen that there is a need for an improved marksmanship training aid that is particularly suitable for use with sniper rifles.

It is, therefore, a principal object of the present invention to provide a marksmanship training aid for displaying and recording the image seen through a rifle sight by a shooter that is lightweight and will not detrimentally upset the balance of a rifle.

It is another object of the present invention to provide a marksmanship training aid that is weather resistant.

It is a feature of the present invention that it can be quickly and easily attached to and removed from a rifle in the field.

It is another feature of the present invention that it is easy operate and maintain.

It is an advantage of the present invention that it provides a lower profile than prior art marksmanship training aids.

These and other objects, features and advantages of the present invention will become apparent as the description of certain representative embodiments proceeds.

SUMMARY OF THE INVENTION

In accordance with the foregoing principles and objects of the present invention, a novel rifle-mountable apparatus for displaying and recording the same image as viewed by a shooter through a rifle sight is described. The unique discovery of the present invention is that optically redirecting part of the image from the eye end of a rifle sight at a 180° angle from the optical axis of the rifle sight to a video camera positioned over and parallel with the rifle sight makes a more compact and better balanced training aid than that provided by prior art viewing systems.

Accordingly, the present invention is directed to an optical system for displaying and recording the same image as viewed by a shooter through a weapon sight, comprising a housing for mounting at the weapon sight, a beam splitter for positioning at an end of the weapon sight and for redirecting a part of the image intended for viewing by the shooter at a first angle from the optical axis of the weapon sight, a reflector for redirecting the redirected part image at a second angle from the optical axis of the weapon sight so that the redirected part image is redirected 180° from the image intended for viewing by the shooter, a video camera for receiving the redirected part image and aligned so that, when the optical system is mounted at the weapon sight, the optical axis of the camera is parallel with the optical axis of the weapon sight, and a video output from the video camera for connecting the video camera to a remote video recorder and to a remote video display device.

DESCRIPTION OF THE DRAWINGS

The present invention will be more clearly understood from a reading of the following detailed description in conjunction with the accompanying drawings wherein.

DETAILED DESCRIPTION

Figure 1:
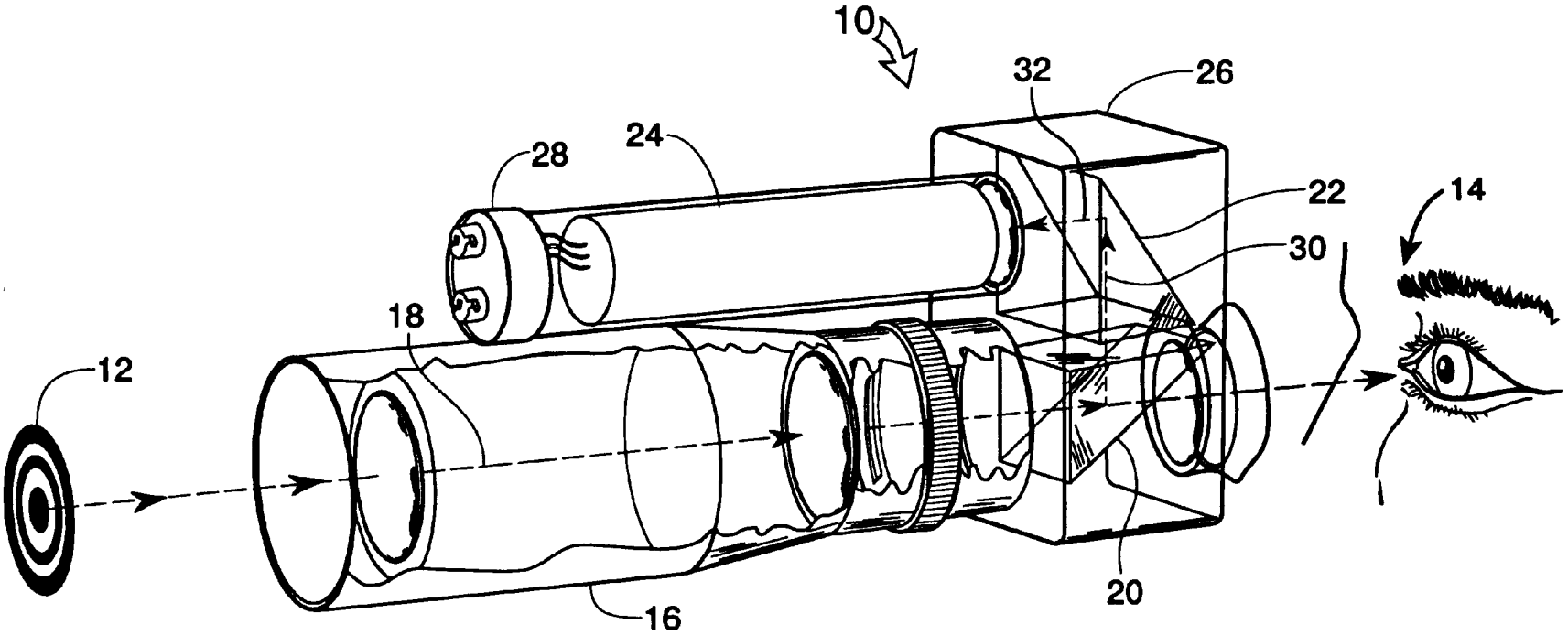
FIG. 1 is a perspective view of an optical system for displaying and recording the same image as viewed by a shooter through a rifle sight according to the teachings of the present invention showing a beam splitter, a righting prism and a video camera for mounting onto a rifle; and, FIG. 2 is an illustrative perspective view of a shooter and an instructor using the FIG. 1 apparatus on a rifle during a marksmanship training session.

Referring now to FIG. 1 of the drawings, there is shown a perspective view of an optical system 10 for displaying and recording the same image of a target 12 as viewed by a shooter 14 through a rifle sight 16. Rifle sight 16 is a telescopic sight in this embodiment, but the invention will work with any rifle sight, optical, open or otherwise. Rifle sight 16 has an optical axis, or optical path, 18. Optical system 10 includes an optical beam splitter 20, a righting prism 22 and a color video camera 24 inside a waterproof housing 26. Video camera 24 includes standard video connectors 28. Housing 26 attaches to rifle sight 16, or to the rifle on which rifle sight 16 is mounted, such that the optical axis of beam splitter 20 is perfectly centered with optical path 18 of rifle sight 16. Beam splitter 20 is custom ground to exactly fit the rear ocular of rifle sight 16. Beam splitter 20 will redirect, or reflect, part of the image of target 12 90° from optical path 18 along an optical path 30. Righting prism 22 then reflects the image another 90° along an optical path 32 to the input of video camera 24. Beam splitter 20 and righting prism 22 do not need to each bend light exactly 90°. It is only necessary that the two angles be supplemental, that is, that their sum be 180° such that the original image of target 12 along optical path 18 is redirected 180° so that video camera 24 can be mounted directly over and parallel with rifle sight 16, thus more nearly preserving the overall balance of a rifle on which optical system 10 is mounted. Similarly, beam splitter 20 and righting prism 22 need not be prisms, but can be any functionally equivalent optical devices, including a single optical device that combines both beam splitter and righting function into a single optical component.

Figure 2:
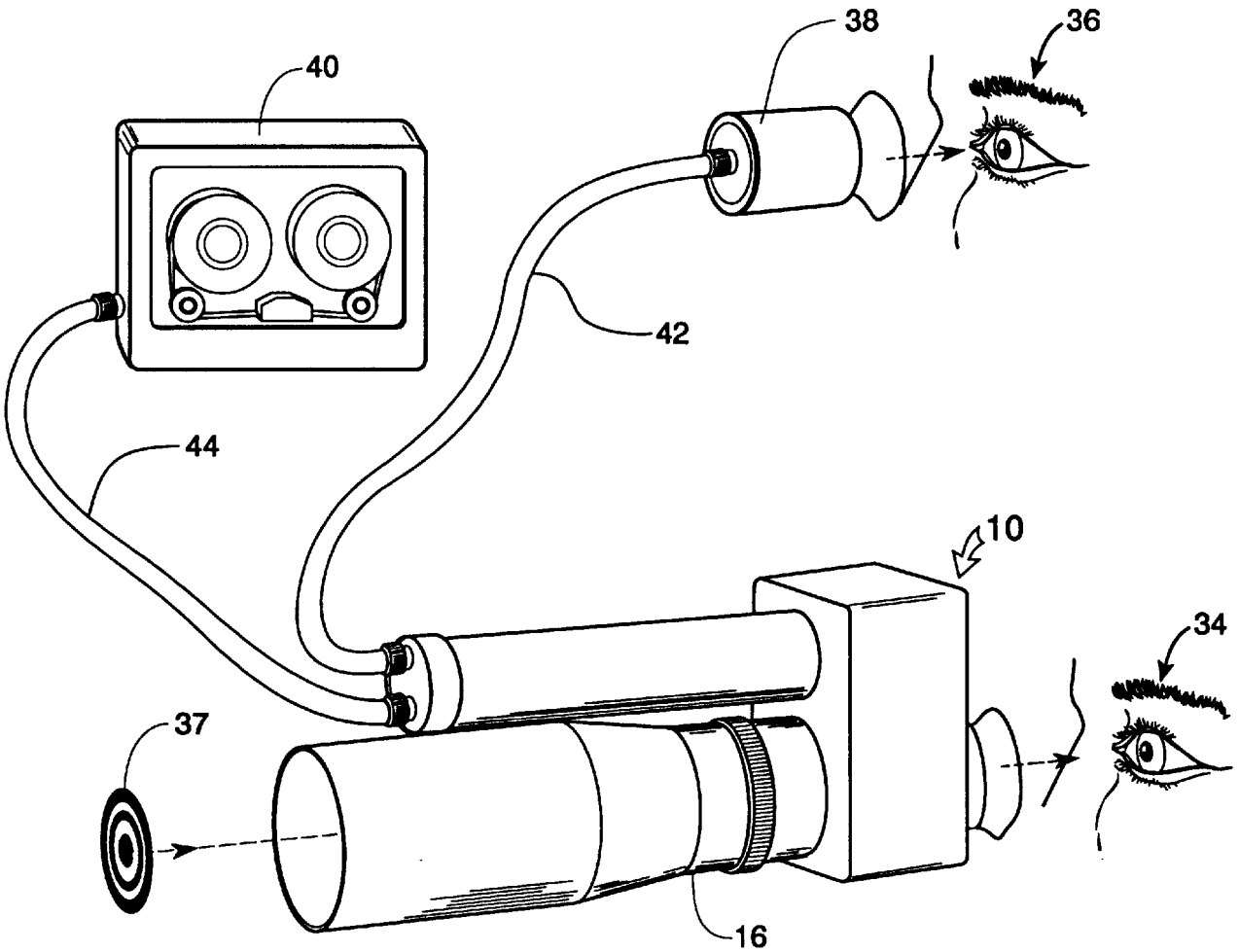

FIG. 2 is an illustrative view of a shooter 34 and an instructor 36 using the FIG. 1 apparatus on a rifle during a marksmanship training session or during actual use in the field. As shooter 34 sights a target 37 through telescopic sight 12, a part of the target image is redirected through beam splitter 20 and righting prism 22 to video camera 24. Video camera 24 converts the part of the target image directed to it into an electrical signal which is transmitted by small video cables 42 and 44 to a hand-held video display 38 for viewing by instructor 36, and to a battery-powered miniature 8 mm video recorder 40, preferably including a time and date recording capability.

A preliminary version of the disclosed invention has used a 1"×4" Sony cylindrical color camera, a Sony EVO-220 micro 8 millimeter video recorder and a Sony 0.7 inch diagonal color display for the viewer. The waterproof housing mounts onto the rifle sight by two custom clamps, and a pair of set screws secures and aligns the beam splitter end of the invention to the eye end of the rifle sight. The video recorder and color display are housed together in a separate case assembly. The case assembly also houses a battery and battery charger and also includes a compartment for storing the camera/optics assembly, video cables and assembly tools.

The disclosed optical system for displaying and recording the image viewed by a shooter through a weapon sight successfully demonstrates the advantages of bending the image 180° so that a camera receiving the image can be mounted over and parallel with the weapon sight for better overall balance. Although the disclosed invention is specialized, its teachings will find application in other areas where optical enhancements to existing apparatus need to be made without detrimentally affecting the original feel and operation of the existing apparatus.

The term "optical axis" as used in the claim is understood to refer to any axis for light transmission, including the open space between open sights, and not just to an axis through optical components such as are found in a telescopic rifle sight. Also, the beam splitter and reflector which are listed as separate claim elements in the claims will also be understood by those of ordinary skill in the art to be able to be equivalently viewed as a single claim element performing two separate functions.

It is understood that modifications to the invention may be made, as might occur to one with skill in the field of this invention, within the scope of the appended claim. Therefore, all embodiments contemplated have not been shown in complete detail. Other embodiments may be developed without departing from the spirit of this invention of from the scope of the appended claim.

We claim:

1. An optical system for displaying and recording the same image as viewed by a shooter through a weapon sight, the weapon sight having an optical axis and an eyepiece, comprising:

(a) a housing for mounting at the weapon sight;

(b) a beam splitter, positioned inside the housing, for positioning at the eyepiece end of the weapon sight and for redirecting a percentage of the image intended for viewing by the shooter at a first angle from the optical axis of the weapon sight, wherein the redirected image includes the entire cross-sectional area of the image received from the eyepiece;

(c) a reflector, positioned inside the housing, for redirecting the redirected image from the beam splitter at a second angle from the optical axis of the weapon sight so that the redirected image is redirected 180° from the image intended for viewing by the shooter;

(d) a video camera, positioned inside the housing and having an optical axis, for receiving the redirected image from the reflector and aligned so that, when the optical system is mounted at the weapon sight, the optical axis of the camera is parallel with the optical axis of the weapon sight; and, (e) a video output form the video camera for connecting the video camera to a remote video recorder and to a remote video display device.

* * * * *